(12) United States Patent
Oh et al.

(10) Patent No.: US 8,774,306 B2
(45) Date of Patent: Jul. 8, 2014

(54) APPARATUS AND METHOD FOR TRANSMITTING AND RECEIVING

(75) Inventors: Mi Kyung Oh, Gyeongju-si (KR); Cheol-ho Shin, Daejeon (KR); Byoung Hak Kim, Daejeon (KR); Seung Sik Lee, Daejeon (KR); Sangsung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 209 days.

(21) Appl. No.: 13/217,435

(22) Filed: Aug. 25, 2011

(65) Prior Publication Data

US 2012/0163444 A1    Jun. 28, 2012

(30) Foreign Application Priority Data

Dec. 23, 2010 (KR) .................. 10-2010-0133697

(51) Int. Cl.
*H04L 27/10* (2006.01)
(52) U.S. Cl.
USPC .......................................... 375/273
(58) Field of Classification Search
USPC ......... 375/259, 271, 272, 273, 295, 302, 303, 375/239
See application file for complete search history.

(56) References Cited

U.S. PATENT DOCUMENTS

| | | | |
|---|---|---|---|
| 2003/0076855 A1* | 4/2003 | Chamberlain | 370/447 |
| 2004/0100897 A1* | 5/2004 | Shattil | 370/206 |
| 2004/0240575 A1* | 12/2004 | Rainbolt | 375/267 |
| 2006/0008085 A1* | 1/2006 | Matsuo | 380/34 |
| 2008/0260019 A1* | 10/2008 | Aoyagi | 375/239 |
| 2009/0154589 A1* | 6/2009 | Monnerie | 375/269 |
| 2010/0124269 A1 | 5/2010 | Lee et al. | |

FOREIGN PATENT DOCUMENTS

| | | |
|---|---|---|
| KR | 1020100055955 | 5/2010 |
| KR | 1020100096668 | 9/2010 |

* cited by examiner

*Primary Examiner* — Sam K Ahn
*Assistant Examiner* — Vineeta Panwalkar
(74) *Attorney, Agent, or Firm* — Nelson Mullins Riley & Scarborough LLP (57) ABSTRACT

A transmitting apparatus groups a data bit sequence to groups each formed of a predetermined number of bits, modulates predetermined bits of one of groups through a frequency shift keying (FSK) modulation method, non-continuously aligns the FSK modulation signals, and transmits the non-continuous FSK modulation signals.

12 Claims, 10 Drawing Sheets

APPARATUS AND METHOD FOR TRANSMITTING AND RECEIVING

CROSS-REFERENCE TO RELATED APPLICATION

This application claims priority to and the benefit of Korean Patent Application No. 10-2010-0133697 filed in the Korean Intellectual Property Office on Dec. 23, 2010, the entire contents of which are incorporated herein by reference.

BACKGROUND OF THE INVENTION (a) Field of the Invention

The present invention relates to apparatus and method for transmitting and receiving a signal. More particularly, the present invention relates to a transmitting apparatus using frequency shift keying (FSK) modulation and a method thereof, and a receiving apparatus for demodulating a signal modulated according to FSK modulation and a method thereof.

(b) Description of the Related Art

Frequency shift keying (FSK) modulation has been receiving attention again as a method for supporting low power communication and medium to long distance communication.

A FSK modulation-based transmission method consumes a low amount of power and can be realized as a small transceiver. Accordingly, the FSK modulation-based transmission method has been adopted as a physical layer of international standard of a smart utility network (SUN) defined in IEEE 802.15.4 g.

The FSK modulation-based transmission method is a technology for transmitting a signal by modulating a signal through frequency shift. Accordingly, the FSK modulation-based transmission method is appropriate for a singular spectrum guaranteed environment and a low frequency environment.

Such an FSK modulation-based transmission method is used to transmit a simple digital signal or a simple analog signal. The FSK modulation-based transmission method, however, is not appropriate to realize a transceiver for transmitting a digital signal at a high transmission rate or for efficiently consuming power. Particularly, the FSK modulation-based transmission method has a limitation of reusing a frequency in a multinetwork-based system. That is, in a multinetwork-based system, it is very difficult to reduce distortion caused by multipaths or to reduce interference caused by multinetworks in various wireless environments with the FSK modulation-based transmission method due to interference vulnerability thereof.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmitting/receiving apparatus and a method thereof having advantages of reusing a frequency in an FSK modulation-based transmission method.

The present invention has also been made in an effort to provide a transmitting/receiving apparatus and a method thereof having advantages of simplifying a signal processing structure in a baseband and enabling low power transmission.

An exemplary embodiment of the present invention provides a method for transmitting a signal in a transmitting apparatus. The transmitting method includes grouping a data bit sequence to groups each formed of a predetermined number of bits, generating frequency shift keying (FSK) modulation signals by modulating predetermined bits in a predetermined group of the groups based on an FSK modulation scheme, generating a transmission signal by non-continuously aligning the FSK modulation signals, and transmitting the transmission signal.

Another exemplary embodiment of the present invention provides a method for receiving a signal in a receiving apparatus. The receiving method includes receiving a signal that a predetermined signal part is modulated based on a frequency shift keying (FSK) modulation scheme and maintaining a signal part is modulated based on a different modulation scheme so that the signal modulated based on FSK modulation scheme has a non-continuous form, extracting information bits from the received signal by performing an FSK demodulation scheme corresponding to the FSK modulation scheme, extracting information bits from the received signal by performing demodulation corresponding to the different modulation scheme, and generating a data bit sequence of a transmission signal by realigning the extracted information bits from the demodulation corresponding to the FSK demodulation scheme and the different demodulation scheme.

Still another exemplary embodiment of the present invention provides an apparatus for transmitting a signal. The transmitting apparatus includes a grouping unit, a first modulator, a second modulator, and a signal transmitter. The grouping unit groups a data bit sequence to groups each formed of a predetermined number of bits. The first modulator generates FSK modulation signals by modulating predetermined bits of a predetermined one of the groups based on a frequency shift keying (FSK) modulation scheme. The second modulator non-continuously aligns the FSK modulation signals by modulating the remaining bits of the predetermined group based on a different modulation scheme from the FSK modulation scheme. The signal transmitter transmits the non-continuously aligned FSK modulation signals as a transmission signal.

Yet another exemplary embodiment of the present invention provides an apparatus for receiving a signal. The receiving apparatus includes a signal receiver, a first demodulator, and a data realigner. The signal receiver receives a non-continuous FSK modulation signal that is modulated based on a non-continuous frequency shift keying (FSK) modulation scheme. The first demodulator extracts information bits by demodulating the received signal based on a predetermined demodulation scheme corresponding to the received signal. The data realigner generates a transmission signal by realigning the extracted information bits from the demodulator.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, in addition, unless explicitly described to the contrary, the word "comprise" and variations such as "comprises" or "comprising" will be understood to imply the inclusion of stated elements but not the exclusion of any other elements.

Hereinafter, a transmitting/receiving method and apparatus according to an exemplary embodiment of the present invention will be described with reference to the accompanying drawings.

Figure 1A:
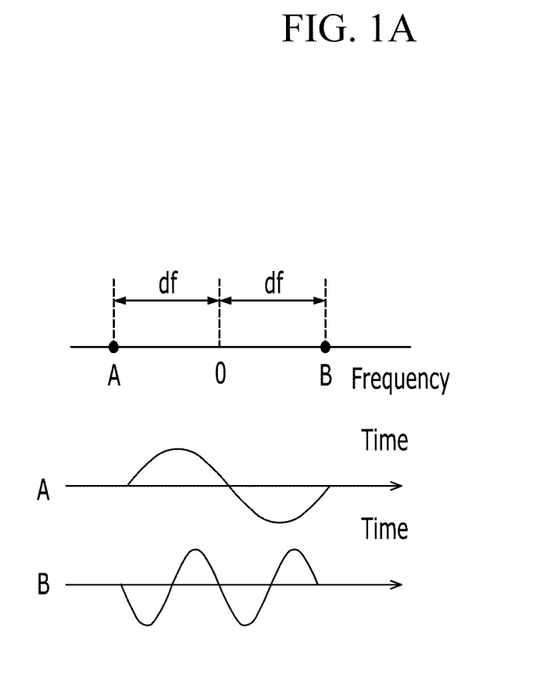
FIG. 1A and FIG. 1B are diagrams illustrating a typical FSK modulation method.
Figure 1B:
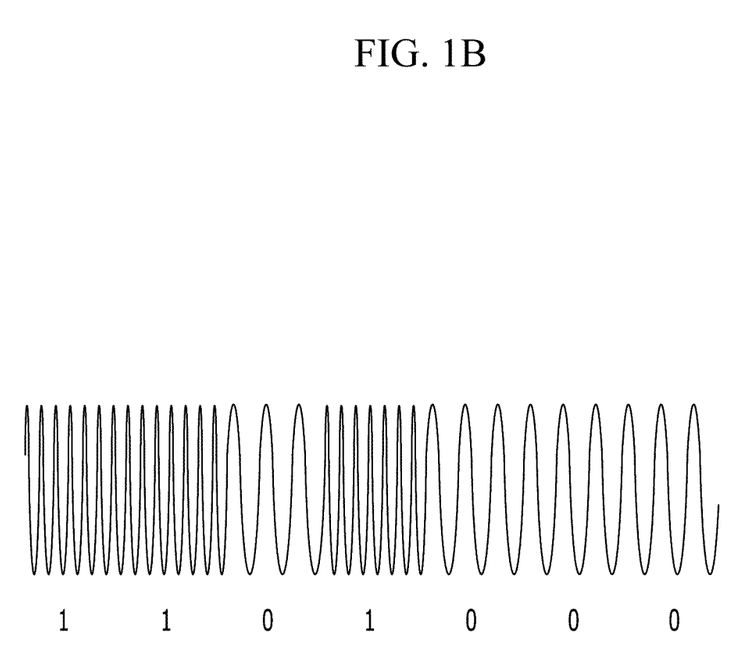
Figure 2:
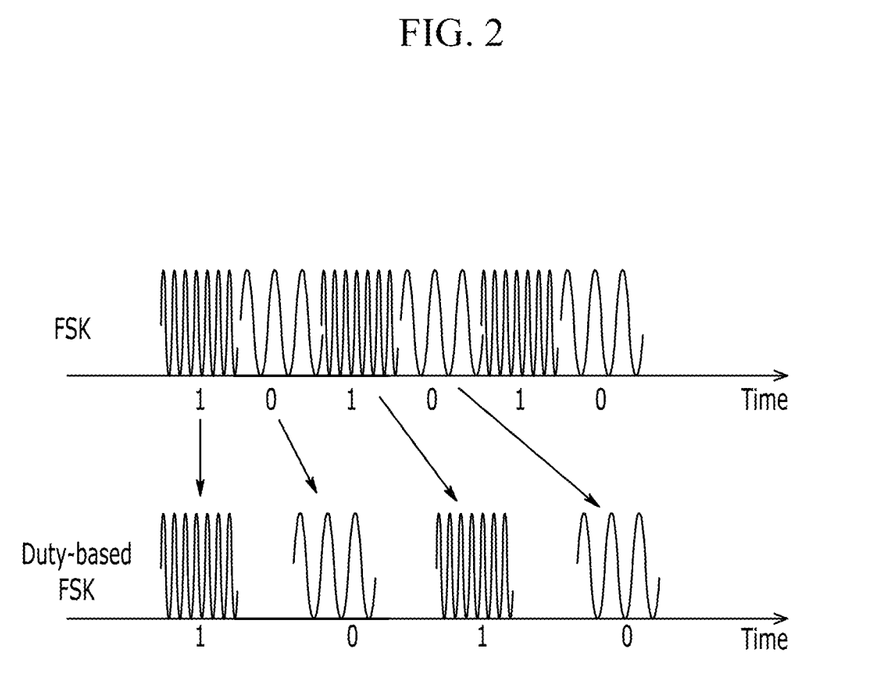
FIG. 2 is a diagram illustrating a duty-based FSK modulation method according to the first exemplary embodiment of the present invention.

FIG. 1A and FIG. 1B are diagrams illustrating a typical FSK modulation method. FIG. 2 is a diagram illustrating a duty-based FSK modulation method according to the first exemplary embodiment of the present invention.

Referring to FIG. 1A and FIG. 1B, a frequency shift keying (FSK) modulation method is a modulation scheme for modulating an input signal to be transmitted using frequency variation. The input signal is a digital bit. The FSK modulation method changes the frequency of a signal to express 0 and 1.

As shown in FIG. 1A, a transmitting apparatus uses frequencies A and B to express 0 and 1. The frequencies A and B are separated at a predetermined frequency (df) from a carrier frequency 0 in opposite directions. That is, the transmitting apparatus transmits one of the frequencies A and B when the input signal is 0 and transmits the other when the input signal is 1. For instance, the transmitting apparatus may transmit the frequency A when the input signal is 0 and transmit the frequency B when the input signal is 1. Accordingly, when the transmitting apparatus continuously transmits bits of 1101000, a signal of 1101000 is transmitted by shifting frequencies from a carrier frequency 0 as much as a predetermined constant amount of frequency as shown in FIG. 1B.

A receiving apparatus determines whether a bit of a received signal is 1 or 0 at a corresponding position by sensing frequency variation in the received signal.

If an input signal is modulated using FSK modulation, the FSK modulated signal [s(t)] may be expressed as Equation 1.

$$s(t) = \sin(2\pi(f_c + b_k \Delta f)t) \quad \text{[Equation 1]}$$

Herein, $f_c$ denotes a carrier frequency, $\Delta f$ is a FSK frequency shift, and $b_k$ represents a digital signal to be transmitted.

As shown in Equation 1, a modulation index of a digital signal is determined according to $b_k$ variation. Accordingly, narrowband FSK ($\Delta f < b_k$ variation) and wideband FSK may be defined according to $b_k$ and $\Delta f$. In general, the narrowband FSK has been frequently used for frequency efficiency.

Such a typical FSK modulation method has been modified into a minimum shift keying (MSK) modulation method and a Gaussian minimum shift keying (GMSK) modulation method due to frequency efficiency and limitation in spectrum usage. The MSK modulation method and the GMSK modulation method have been used for a transmitting apparatus.

Equation 2 shows a MSK modulation signal [s(t)]. The MSK modulation signal is a signal modulated based on the MSK modulation method.

$$\begin{aligned} s(t) &= a_I(t)\cos\left(\frac{\pi t}{2T}\right)\cos(2\pi f_c t) - a_Q(t)\cos\left(\frac{\pi t}{2T}\right)\cos(2\pi f_c t) \\ &= \cos\left[2\pi f_c t + b_k(t)\frac{\pi t}{2T} + \phi_k\right] \end{aligned} \quad \text{[Equation 2]}$$

In Equation 2, $a_I(t)$ and $a_Q(t)$ denote two digital bits to be transmitted during 2T periods. $b_k(t)$ has a value of 1 when $a_I(t)$ is identical to $a_Q(t)$, and has a value of −1 when $a_I(t)$ is different from $a_Q(t)$. $\phi^k$ has a value of 0 when $a_I(t)$ is 1 or has a value of $\pi$ when $a_I(t)$ is 0.

The GMSK modulation method is a modulation method that additionally uses a Gaussian filtering scheme with the MSK modulation method without directly using a digital bit. Such a GMSK modulation method has been used in a global system for mobile communications (GSM).

In general, the FSK modulation signal is formed of wireless signals having a continuous signal form as shown in FIG. 1B. That is, a wireless signal generated according to digital bits has a continuous signal form. In order to control a data rate therefor, it is required to set up different $\Delta f$ by changing the FSK constellation position. In this case, operations of a mixer and a phase locked loop (PLL) become different. Further, the FSK modulation method requires a comparative long time for transmitting data. Accordingly, the power consumption of radio frequency (RF) hardware is large and interference thereof significantly influences other systems.

In order to overcome such problems, a transmitting apparatus according to an exemplary embodiment of the present invention uses a duty-based FSK modulation method. The duty-based FSK modulation method transmits an FSK modulation signal as a form of a pulse. As shown in FIG. 2, the transmitting apparatus modulates an input signal to a non-continuous FSK modulation signal using the duty-based FSK modulation method and transmits the non-continuous FSK modulation signal. In this case, it is possible to support a full data rate obtainable with a given $\Delta f$ and any lower data rates without modifying modulation parameters. Further, when an interval of appearing signal transmission is controlled in the duty-based FSK modulation method, such signal appearance on a radio frequency (RF) can appear as an on/off formation. The off period advantageously does not influence other systems. Also, multinetwork operation, which was not supported by a typical FSK modulation method, can be enabled. That is, a frequency can be reusable even in signal transmission of the FSK modulation method.

The duty-based FSK modulation method does not need to fix a position for signal presence. In order to randomly change interference to other systems, a position of an on period can be hopped according to a predetermined pattern rather than a fixed position for the on period.

A transmitting apparatus for supporting such operation will be described in detail with reference to FIG. 3.

Figure 3:
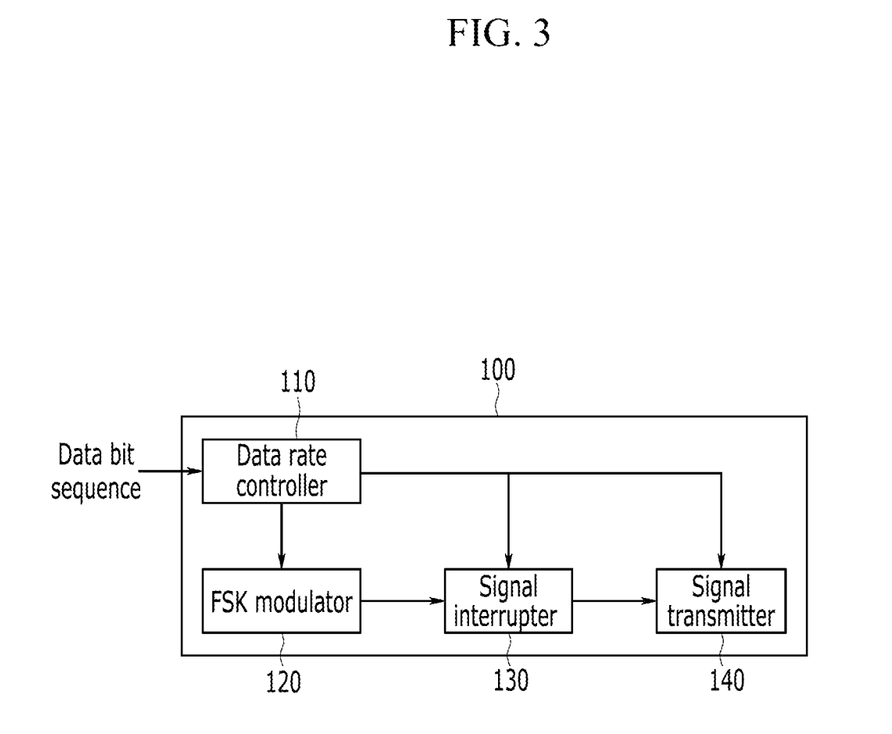
FIG. 3 is a diagram illustrating a transmitting apparatus according to the first exemplary embodiment of the present invention.

FIG. 3 is a diagram illustrating a transmitting apparatus according to the first exemplary embodiment of the present invention.

Referring to FIG. 3, the transmitting apparatus 100 according to the present exemplary embodiment includes a data rate controller 110, an FSK modulator 120, a signal interrupter 130, and a signal transmitter 140.

The data rate controller 110 outputs an input data bit sequence to the FSK modulator 120 according to a predetermined data rate. The data rate is the number of bits transmitted per second (bits/sec). The data rate controller 110 also transmits the predetermined data rate to the signal interrupter 130 and the signal transmitter 140.

The FSK modulator 120 modulates the input data bit sequence to an FSK modulation signal based on the FSK modulation method according to the predetermined data rate, and outputs the FSK modulation signal to the signal interrupter 130.

The signal interrupter 130 transfers the FSK modulation signal to the signal transmitter 140 at a transmission time. That is, the signal interrupter 130 outputs the FSK modulation signal to the signal transmitter 140 at the transmission time without directly transmitting the FSK modulation signal on an RF through the signal transmitter 140. By interrupting transmission of the FSK modulation signal, the FSK modulation signal becomes a non-continuous signal form as shown in FIG. 2. The FSK modulation signal is divided into an on period for transmitting a signal and an off period for not transmitting a signal. That is, the signal output from the signal interrupter 130 is converted to a duty-based FSK modulation signal having on/off periods.

The signal transmitter 140 transmits the FSK modulation signal on an RF. Here, the signal transmitter 140 performs a power off operation during the off period when a signal is not transmitted. Accordingly, power consumption can be reduced.

As described above, the duty-based FSK modulation signal is transmitted by controlling the data rate at the data rage controller 110.

Equation 3 shows the duty-based FSK modulation signal.

$$s(t)=G(t,r)\sin(2\pi(f_c+b_k\Delta f)t) \quad [\text{Equation 3}]$$

In Equation 3, G(t,r) has a value of 1 at a time of transmitting a signal and has a value of 0 at a time of not transmitting a signal. That is, G(T,r) may have a predetermined constant pattern. r denotes a target data rate.

Frequency noise can be reduced while increasing a data rate by applying a pulse position modulation (PPM) method to the duty-based FSK modulation method.

Figure 4:
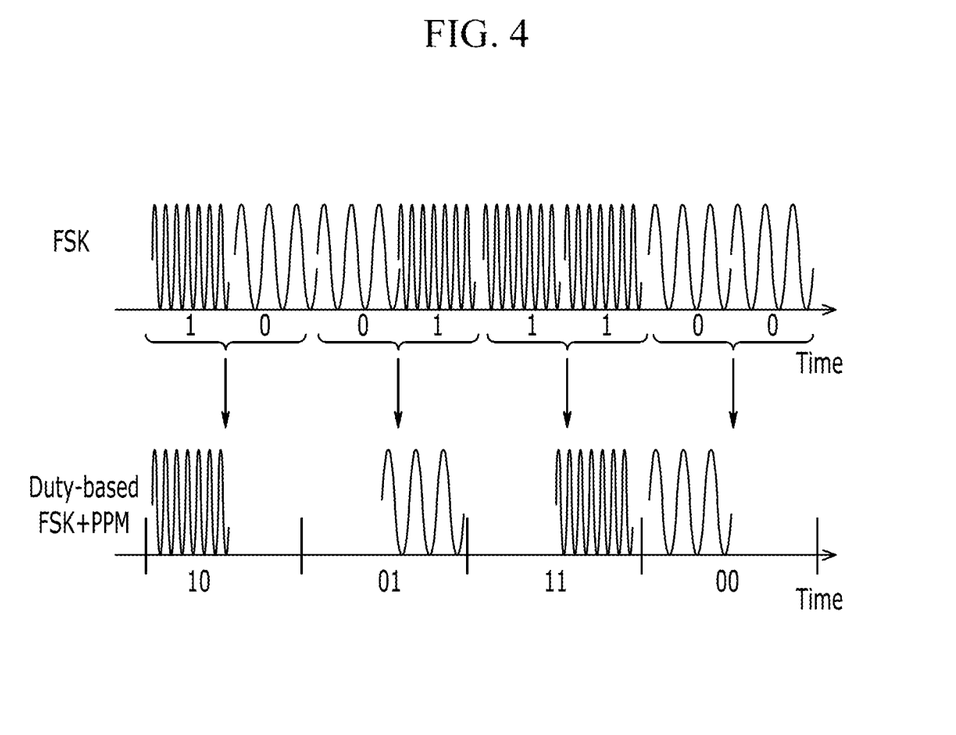
FIG. 4 is a diagram illustrating a PPM combined duty-based modulation method according to the second exemplary embodiment of the present invention.

FIG. 4 is a diagram illustrating a PPM combined duty-based FSK modulation method according to the second exemplary embodiment of the present invention.

Referring to FIG. 4, a transmitting apparatus may transmit a data bit sequence in a non-continuous signal form by grouping a data bit sequence to be transmitted by a predetermined number of bits, modulating predetermined bits in a group using an FSK modulation scheme, and modulating the remaining bits in the group using a PPM scheme. Here, Equation 3 may be expressed as Equation 4 if the PPM scheme is applied to the duty part. That is, a PPM combined duty-based FSK modulation signal[s(t)] may be expressed as Equation 4.

$$s(t)=G(t,\bar{b}_k)\sin(2\pi(f_c+\bar{b}_k\Delta f)t) \quad [\text{Equation 4}]$$

In Equation 4, $\dot{b}_k$ denotes grouped transmission bits, and $G(t,\dot{b}_k)$ denotes a function performing a PPM function for determining a position to transmit an FSK modulation signal using predetermined bits in a group.

That is, a transmission position of an FSK modulation signal is mapped to a pulse position by the PPM scheme and the FSK modulation signal is transmitted as a transmission signal.

The PPM combined duty-based FSK modulation method can reduce the generation of frequency noise by half while having the same data transmission amount compared to the typical FSK modulation.

Although binary FSK and binary PPM are illustrated in FIG. 4 for convenience, the present invention is not limited thereto. The exemplary embodiment of the present invention may be expanded to an M-ary PPM method and an N-ary FSK method.

Also, a phase shift keying (PSK) method may be applied to the on/off type duty-based FSK modulation signal. That is, a transmitting apparatus can transmit a data bit sequence in a non-continuous signal form by grouping a data bit sequence to be transmitted by the predetermined number of bits, modulating predetermined bits in a group using an FSK modulation method, and modulating the remaining bits in the group using the PSK modulation method.

That is, the on/off type duty-based FSK modulation method can transmit 1 bit through two different frequencies. When the PSK modulation method is used with the on/off type duty-based FSK modulation method, 2 bits can be transmitted through two different frequencies because 1 bit can be loaded at a phase of a waveform.

A receiving apparatus receives a channel reference signal, detects a phase from the channel reference signal, and extracts bit information therefrom. Here, the channel reference signal presents on a frequency constellation position. Therefore, the receiving apparatus additionally demodulates bit information from the phase information after receiving the channel reference signal.

Meanwhile, a typical FSK modulation based receiving apparatus or a duty-based FSK modulation based receiving apparatus includes hardware for extracting an FSK modulation signal. Such hardware is not compatible with an orthogonal frequency division multiplexing (OFDM) scheme that has been generally used in a high speed system. Accordingly, the receiving apparatus needs to have two types of hardware for simultaneously realizing a signal modulated based on an FSK modulation method and a signal modulated based on an OFDM modulation method. A method for improving such a problem will be described in detail with reference to FIG. 5.

Figure 5:
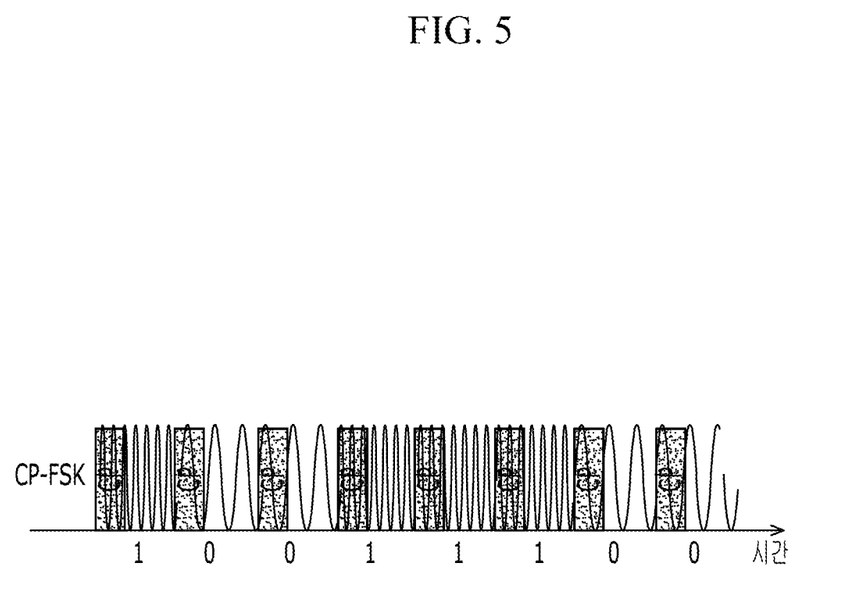
FIG. 5 is a diagram illustrating a CP-FSK modulation method according to the second exemplary embodiment of the present invention.

FIG. 5 is a diagram illustrating a CP-FSK modulation scheme according to the second exemplary embodiment of the present invention.

Referring to FIG. 5, a transmitting apparatus generates a CP-FSK modulation signal by inserting a cyclic prefix (CP) in an FSK modulation signal for transmitting a 1 bit signal using a CP-FSK modulation method and transmits the CP-FSK modulation signal as a transmission signal.

An OFDM scheme can remove interference between symbols due to the cyclic prefix (CP) and transmit and receive data at a high transmit rate. However, since a transmitting apparatus using a typical FSK modulation method transmits an FSK modulation signal corresponding to one or a half cycle as shown in FIG. 1B, the structure of an FSK modulation signal is changed when a CP is inserted.

However, a predetermined length of a cyclic prefix (CP) can be inserted if a restriction that the FSK modulation is formed in a continuous signal form is eliminated like the duty-based FSK modulation signal according to the first and second exemplary embodiments of the present invention. Finally, a signal can be processed identical to an OFDM method.

The FSK modulation is modified to support orthogonality among constellation positions where data is transmitted. It matches up with characteristics of a subcarrier in an OFDM method. Therefore, a receiving apparatus performs a baseband process only on an FSK modulation signal part in a received signal except the CP. In order to do this, an FSK modulation signal part in a transmission signal except a CP has a sine/cosine integer cycle.

That is, a transmitting apparatus generates a transmission signal formed of an FSK modulation signal and a CP, where a result of multiplying a time length of an FSK modulation signal part with 2Δf is an integer number.

As described above, the CP-FSK modulation method enables a signal processing block in a receiving apparatus to be compatible with an OFDM method. Accordingly, the CP-FSK modulation method uses an FSK structure to access a high speed system using the OFDM method.

Meanwhile, a CP-FSK modulation signal is one transmission unit. Accordingly, the CP-FSK modulation method may be combined with the duty-based FSK modulation method according to the first exemplary embodiment of the present invention and with the PPM combined FSK modulation method according to the second exemplary embodiment of the present invention.

Hereinafter, a transmitting apparatus and a receiving apparatus for supporting operation according to the second and third exemplary embodiments of the present invention will be described in detail with reference to FIG. 6 and FIG. 7.

Figure 6:
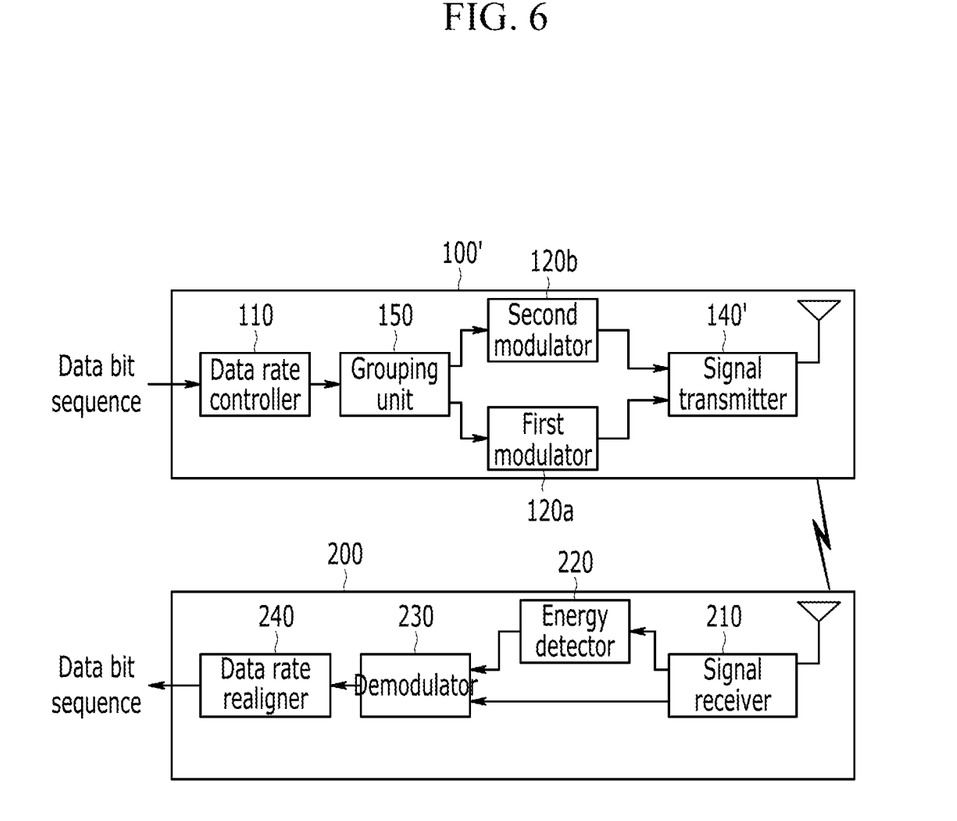
FIG. 6 is a diagram illustrating a transmitting apparatus and a receiving apparatus according to the second exemplary embodiment of the present invention.
Figure 7:
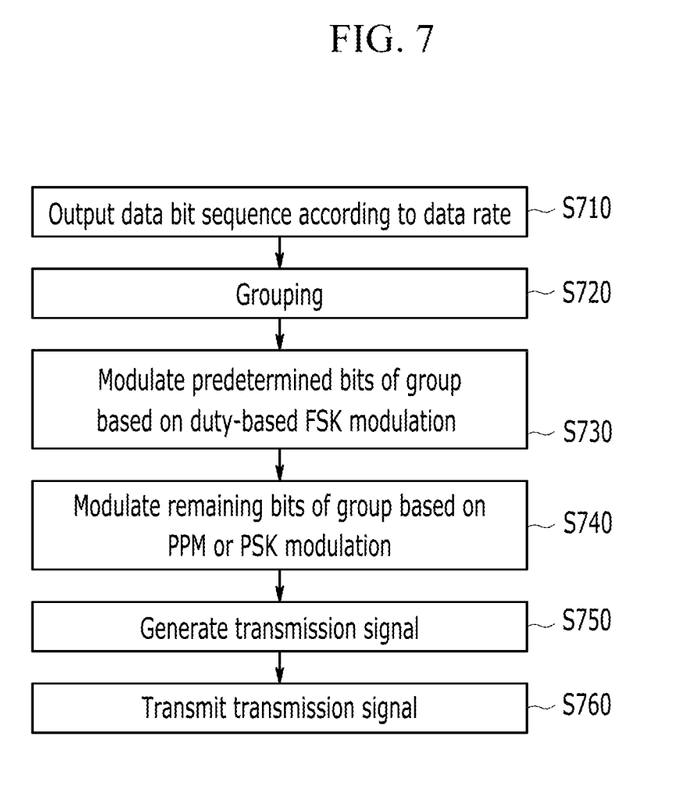
FIG. 7 is a diagram illustrating a method for transmitting a signal in a transmitting apparatus of FIG. 6.
Figure 8:
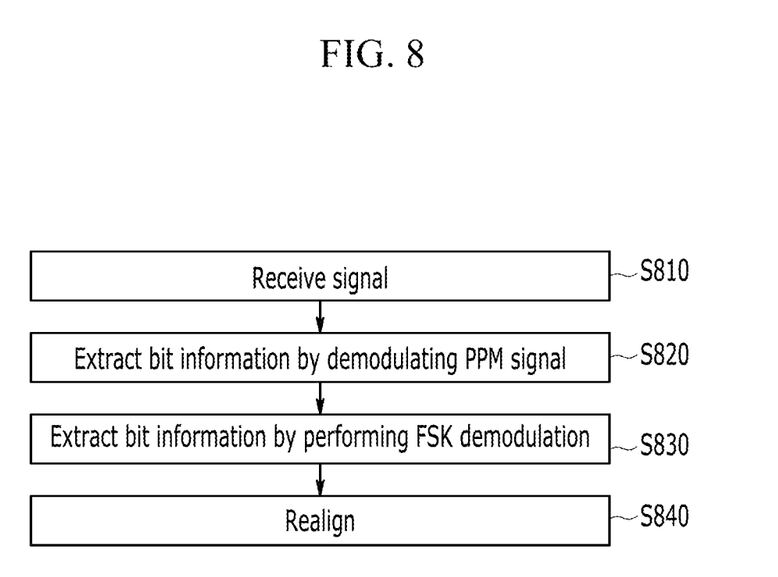
FIG. 8 is a diagram illustrating a method for receiving a signal performed in a receiving apparatus of FIG. 6.

FIG. 6 is a diagram illustrating a transmitting apparatus and a receiving apparatus according to the second exemplary embodiment of the present invention, FIG. 7 is a diagram illustrating a method for transmitting a signal in a transmitting apparatus of FIG. 6, and FIG. 8 is a diagram illustrating a method for receiving a signal performed in a receiving apparatus of FIG. 6.

Referring to FIG. 6, a transmitting apparatus 100' includes a data rate controller 110, a grouping unit 150, first and second modulators 120a and 120b, and a signal transmitter 140'.

Referring to FIG. 7, the data rate controller 110 outputs an input data bit sequence to the grouping unit 150 according to a predetermined data rate at step S710.

The grouping unit 150 groups the input data bit sequence by the predetermined number of bits (n-bits) and outputs the grouped data to the first and second modulators 120a and 120b at step S720. Here, n is greater than 0.

The first modulator 120a modulates predetermined bits in a group based on a duty-based FSK modulation method, and outputs the modulated signal as an FSK modulation signal to the signal transmitter 140' at step S730.

The second modulation unit 120b modulates the remaining bits in the group based on a PPM method or a PSK modulation method, and outputs the modulated signal as a PPM signal or a PSK modulation signal to the signal transmitter 140' at step S740.

The signal transmitter 140' generates a transmission signal by combining the FSK modulation signal from the first modulator 120a and the PPM modulation signal or the PSM modulation signal from the second modulator 120b at step S750, and transmits the transmission signal through an antenna at step S760.

Referring to FIG. 6 again, the receiving apparatus 200 includes a signal receiver 210, an energy detector 220, a demodulator 230, and a data realigner 240.

Referring to FIG. 7, the signal receiver 210 receives a transmission signal from the transmitting apparatus 100 through an antenna at step S810.

The energy detector 220 determines whether a signal is present or not from the received signal as a unit of demodulating a PPM signal, and extracts bit information from the received signal when the signal is present at step S820.

The demodulator 230 extracts bit information by demodulating the received signal using an FSK demodulation method corresponding to the FSK modulation method at step S830. Further, the demodulator 230 additionally extracts bit information from the received signal by demodulating the received signal using a PSK demodulation method corresponding to a PSK modulation method when the transmitting apparatus 100' uses the PSK modulation method combined with the FSK modulation method. In this case, the energy detector 220 does not extract bit information because the transmitting apparatus 100' does not use the PPM method.

Although FIG. 6 illustrates one demodulator 230 performing both of FSK demodulation and PSK demodulation, the FSK demodulation and the PSK demodulation may be performed in different demodulators.

The data realigner 240 forms a data bit sequence by realigning the extracted bit information from the energy detector 220 and the demodulator 230 in a predetermined order at step S840.

Figure 9:
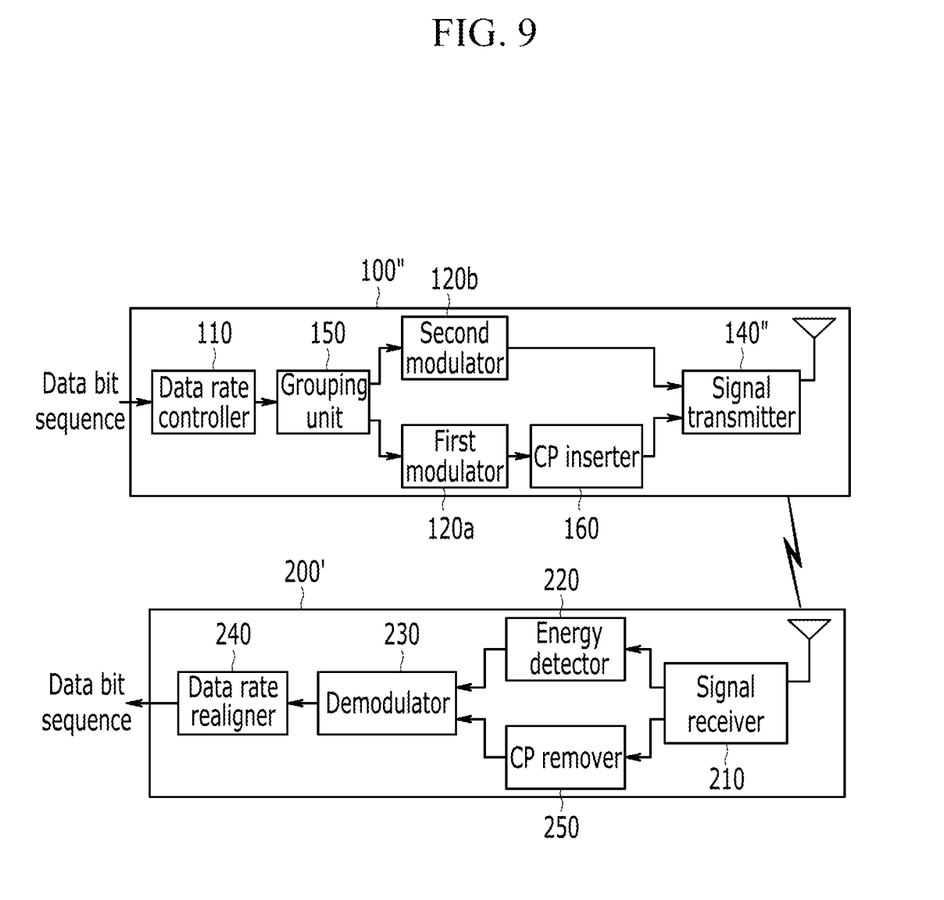
FIG. 9 is a diagram illustrating a transmitting apparatus and a receiving apparatus according to the third exemplary embodiment of the present invention.

FIG. 9 is a diagram illustrating a transmitting apparatus and a receiving apparatus according to the third exemplary embodiment of the present invention.

Referring to FIG. 9, a transmitting apparatus 100" may further include a CP inserter 160.

The CP inserter 160 receives the FSK modulation signal from the first modulator 120a, inserts a CP to an FSK modulation signal corresponding to each bit, and outputs the CP inserted modulation signal as a CP-FSK modulation signal to a signal transmitter 140".

The signal transmitter 140" generates a transmission signal by combining the CP-FSK modulation signal from the CP inserter 160 and a PPM modulation signal or a PSK modulation signal from the second modulator 120b and transmits the transmission signal through an antenna.

As described above, the transmitting apparatus 100" can generate and transmit the transmission signal as shown in FIG. 5.

A receiving apparatus 200' receiving the transmission signal may further include a CP remover 250.

The CP remover 250 removes the CP from the received signal from the signal receiver 210 and transfers the CP removed signal to the demodulator 230.

The demodulator 230 extracts bit information from the received signal by demodulating the CP removed signal using an FSK demodulation method corresponding to the FSK modulation method. The demodulator 230 additionally extracts bit information by demodulating the CP removed signal using the PSK demodulation method corresponding to the PSK modulation when the transmitting apparatus 100 uses the CP-FSK modulation method combined with the PSK modulation method.

The duty-based FSK modulation method according to an exemplary embodiment of the present invention can have a receiving structure that is compatible with an orthogonal frequency division multiplexing (OFDM) method while having the same data throughput compared with a typical FSK modulation method. Further, non-continuous interference signals can be generated, and a frequency can be reduced. Further, the duty-based FSK modulation method according to an exemplary embodiment of the present invention can realize variable data throughputs without controlling a modulation parameter.

The apparatus and method according to an exemplary embodiment of the present invention described above can be realized as a program performing functions corresponding to configuration elements of the apparatus and method or as a computer readable recording medium storing the program. Since the realization can be easily implemented by those skilled in the art to which the exemplary embodiment of the present invention pertains, further description will not be provided herein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a signal in a transmitting apparatus, comprising:
   grouping a data bit sequence to groups each formed of a predetermined number of bits;
   generating frequency shift keying (FSK) modulation signals by modulating predetermined bits in a predetermined group of the groups based on an FSK modulation scheme;
   modulating the remaining bits of the predetermined group based on a different modulation scheme from the FSK modulation scheme, wherein the modulation of the remaining bits of the predetermined group creates non-continuously aligned FSK modulation signals; and
   transmitting the non-continuously aligned FSK modulation signals as a transmission signal.

2. The method of claim 1, wherein the generating the transmission signal includes setting up a period for not transmitting a signal between the FSK modulation signals according to a predetermined data rate.

3. The method of claim 1, wherein the generating the transmission signal includes inserting a cyclic prefix at a front end of an FSK modulation signal corresponding to each bit.

4. The method of claim 3, wherein the generating FSK modulation signals includes generating the FSK modulation signals to have a time domain to be an integer cycle of a sine waveform or a cosine waveform except the cyclic prefix.

5. The method of claim 1, wherein the generating transmission signals includes mapping transmission positions of the FSK modulation signals to pulse positions based on a pulse position modulation (PPM) scheme.

6. The method of claim 5, wherein the mapping transmission positions includes modulating the remaining bits of the predetermined group using the PPM scheme.

7. The method of claim 1, wherein the generating transmission signals includes:
   generating phase shift keying (PSK) modulation signals by modulating the remaining bits of the predetermined group based on a PSK modulation scheme, and
   generating the transmission signal by combining the FSK modulation signals and the PSK modulation signals.

8. An apparatus for transmitting a signal comprising:
   a grouping unit running on a processor, configured to group a data bit sequence to groups each formed of a predetermined number of bits;
   a first modulator configured to generate frequency shift keying (FSK) modulation signals by modulating predetermined bits of a predetermined one of the groups based on a FSK modulation scheme;
   a second modulator configured modulate the remaining bits of the predetermined group based on a different modulation scheme from the FSK modulation scheme, wherein the modulation of the remaining bits of the predetermined group creates non-continuously aligned FSK modulation signals; and
   a signal transmitter configured to transmit the non-continuously aligned FSK modulation signals as a transmission signal.

9. The apparatus of claim 8, further comprising a cyclic prefix (CP) inserter configured to insert a CP to the FSK modulation signal and to output the CP inserted FSK modulation signal to the signal transmitter.

10. The apparatus of claim 9, wherein the first modulator generates the FSK modulation signal to have a time domain to be an integer cycle of a sine waveform or a cosine waveform except the cyclic prefix.

11. The apparatus of claim 8, wherein the different modulation scheme is a pulse position modulation (PPM) scheme or a phase shift keying (PSK) modulation scheme, and
   the signal transmitter generates the transmission signal by combining the FSK modulation signal with a PPM modulation signal or with a PSK modulation signal, which is generated through the PPM scheme or the PSK modulation scheme.

12. The apparatus of claim 8, further comprising a data rate controller configured to output the data bit sequence to the grouping unit according to a predetermined data rate.

* * * * *